(12) United States Patent
Kubota et al.

(10) Patent No.: US 7,699,709 B2
(45) Date of Patent: Apr. 20, 2010

(54) SHAFT COUPLING MECHANISM FOR ELECTRIC POWER STEERING APPARATUS

(75) Inventors: Shuichi Kubota, Kanagawa (JP);
Takashi Horiguchi, Kanagawa (JP);
Katsunori Saito, Kanagawa (JP); Arata Kikuchi, Osaka (JP)

(73) Assignees: Oiles Corporation, Tokyo (JP); Jtekt Corporation, Osaka (JP)

( * ) Notice: Subject to any disclaimer, the term of this patent is extended or adjusted under 35 U.S.C. 154(b) by 298 days.

(21) Appl. No.: 11/793,823

(22) PCT Filed: Dec. 15, 2005

(86) PCT No.: PCT/JP2005/023083

§ 371 (c)(1),
(2), (4) Date: Jul. 13, 2007

(87) PCT Pub. No.: WO2006/068033

PCT Pub. Date: Jun. 29, 2006

(65) Prior Publication Data

US 2008/0128195 A1 Jun. 5, 2008

(30) Foreign Application Priority Data

Dec. 24, 2004 (JP) ............................. 2004-374410

(51) Int. Cl.
*F16D 3/74* (2006.01)
(52) U.S. Cl. ........................................ 464/73; 464/149

(58) Field of Classification Search ................ 464/73, 464/75, 76, 88, 149; 180/444
See application file for complete search history.

(56) References Cited

U.S. PATENT DOCUMENTS

| 1,579,967 | A | * | 4/1926 | Sweney | ................ | 464/149 X |
| 2,924,082 | A | * | 2/1960 | Reich | ................ | 464/76 |
| 4,449,956 | A | * | 5/1984 | Ueno | ................ | 464/149 |
| 2008/0035414 | A1 | * | 2/2008 | Kubota et al. | ................ | 180/444 |

FOREIGN PATENT DOCUMENTS

| GB | 2126690 | 3/1984 |
| JP | 58-211022 | 12/1983 |
| JP | 2004-148990 | 5/2004 |
| JP | 2004-149070 | 5/2004 |
| WO | WO 99/65758 | 12/1999 |

OTHER PUBLICATIONS

International Search Report mailed Mar. 20, 2006.

* cited by examiner

*Primary Examiner*—Greg Binda
(74) *Attorney, Agent, or Firm*—Nixon & Vanderhye P.C.

(57) ABSTRACT

A shaft coupling mechanism includes a coupling base body coupled to a rotating shaft; a coupling base body coupled to a steering shaft; rotation transmitting members which are disposed between the rotating shaft and the steering shaft through the both coupling base bodies and transmit the rotation of the rotating shaft in an R direction to the steering shaft; an intermediate interposed member disposed between the rotation transmitting members; and a coupling means for coupling the rotation transmitting members to each other.

15 Claims, 5 Drawing Sheets

[Fig.1]
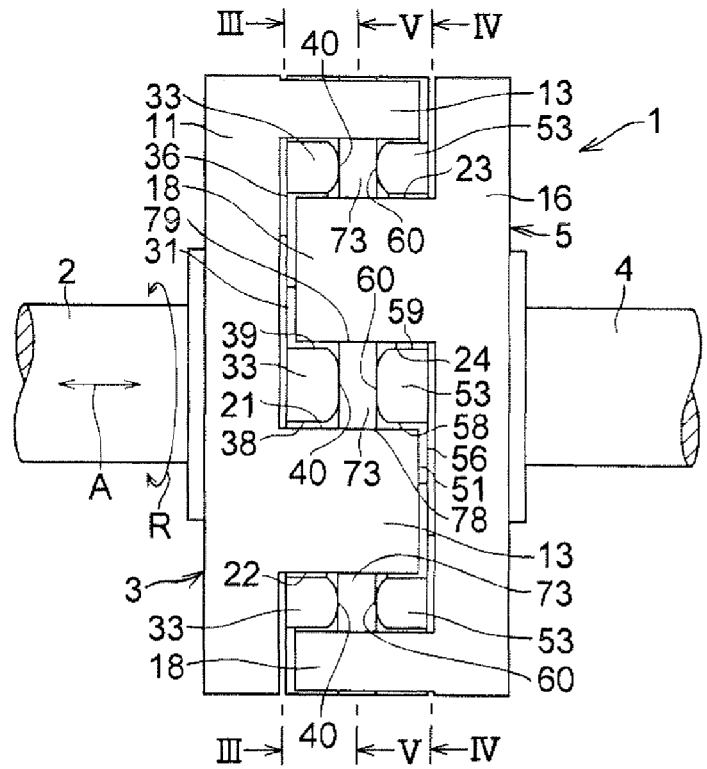
[Fig.2]
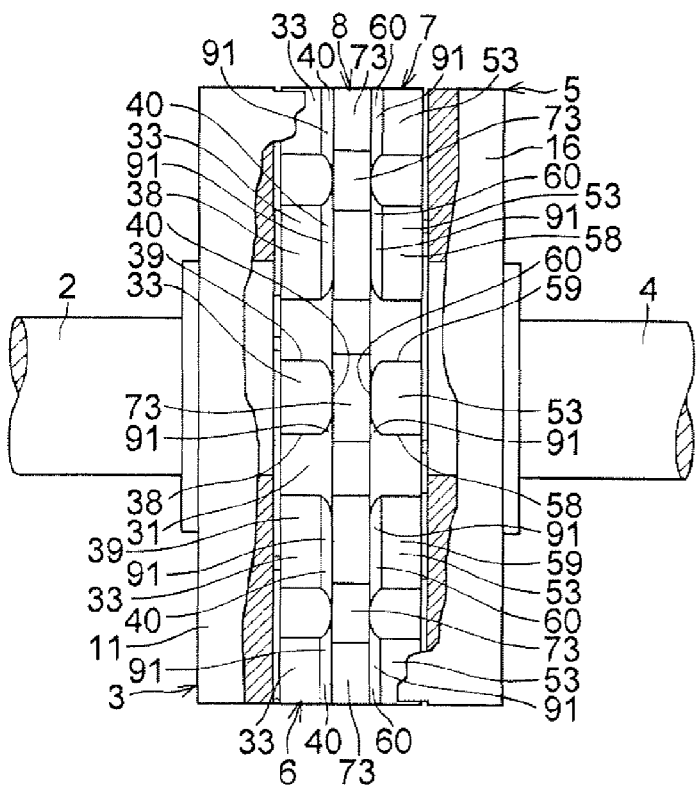

[Fig.3]
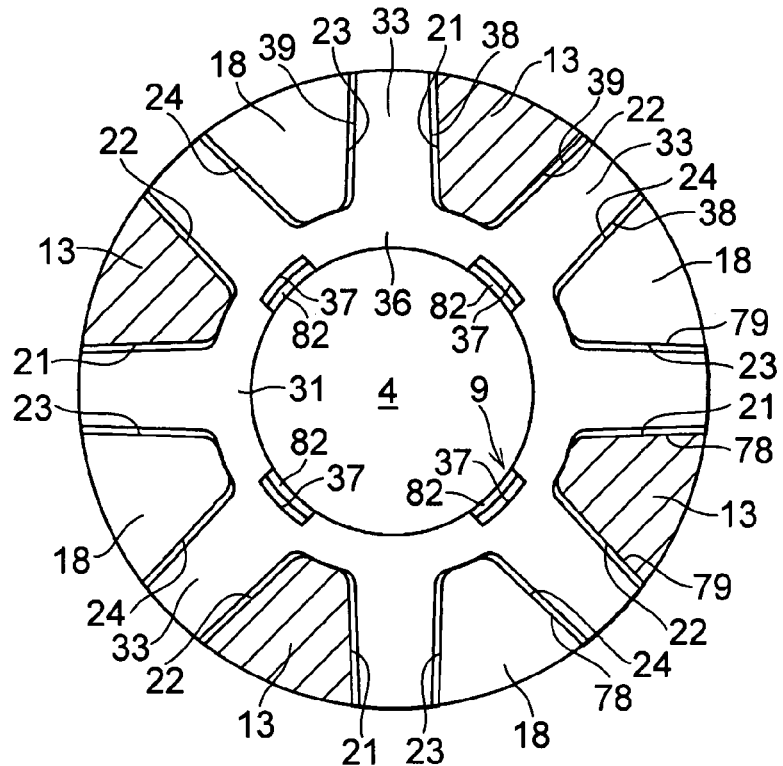
[Fig.4]
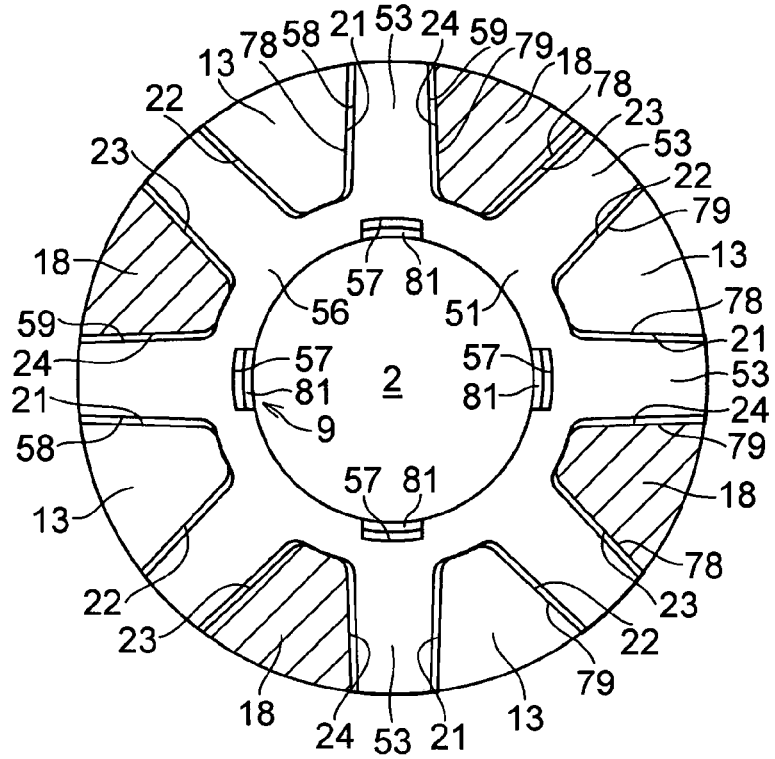

[Fig.5]
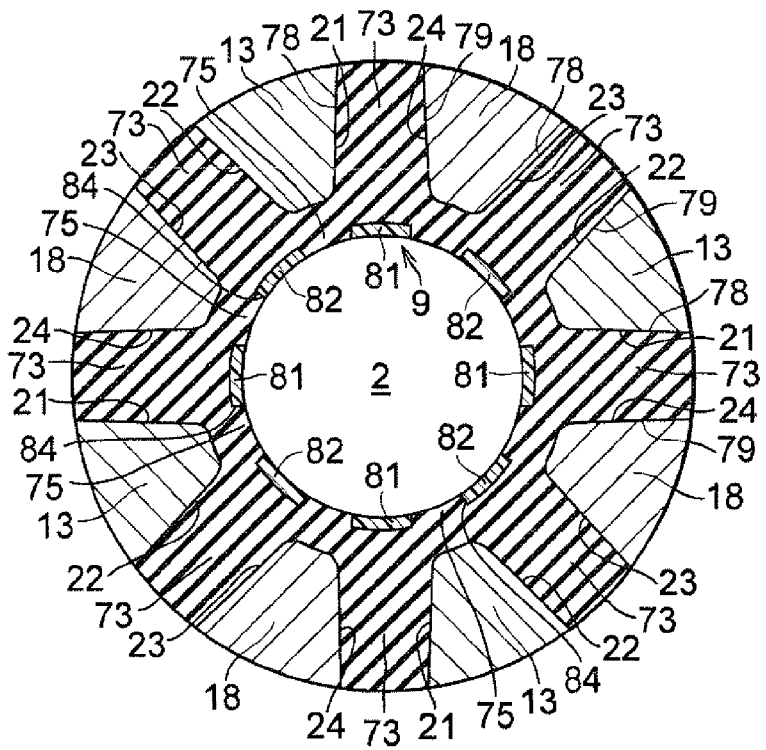
[Fig.6]
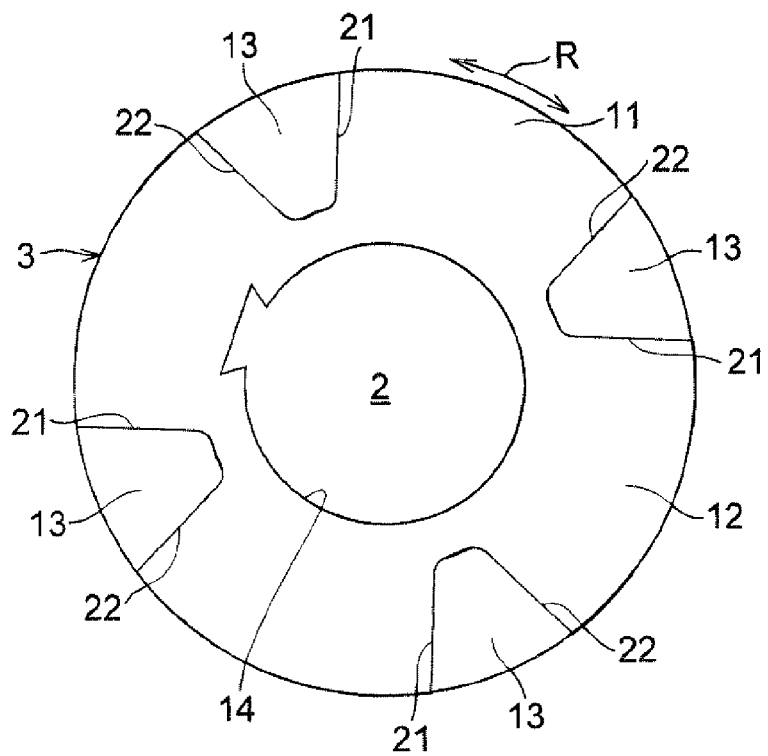

[Fig.7]
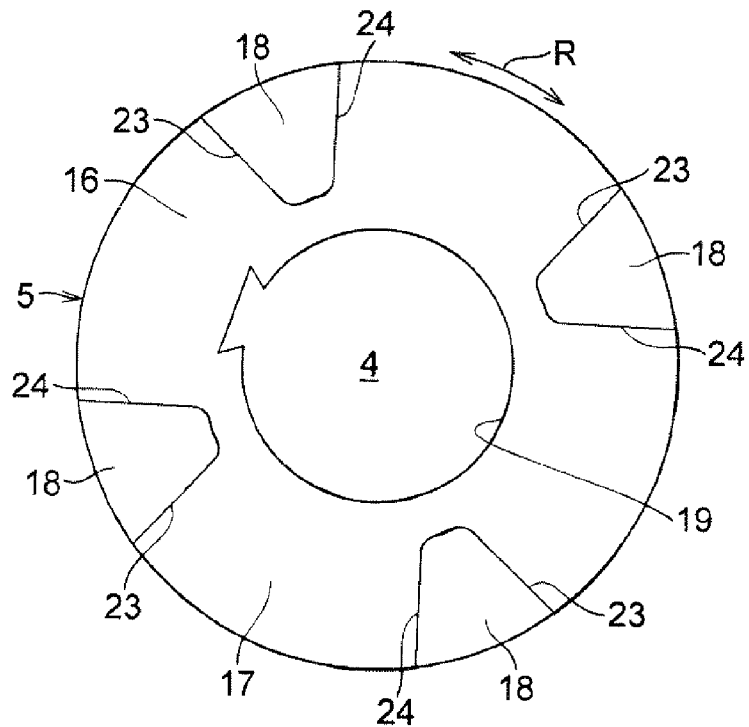
[Fig.8]
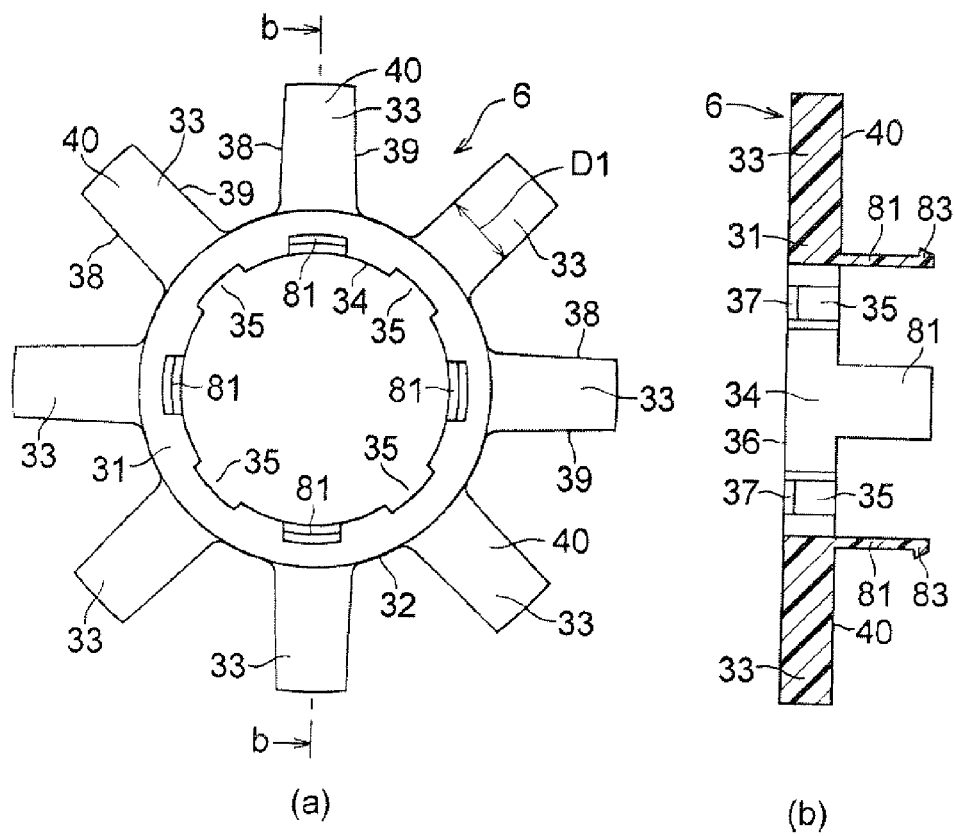
(a)            (b)

[Fig.9]
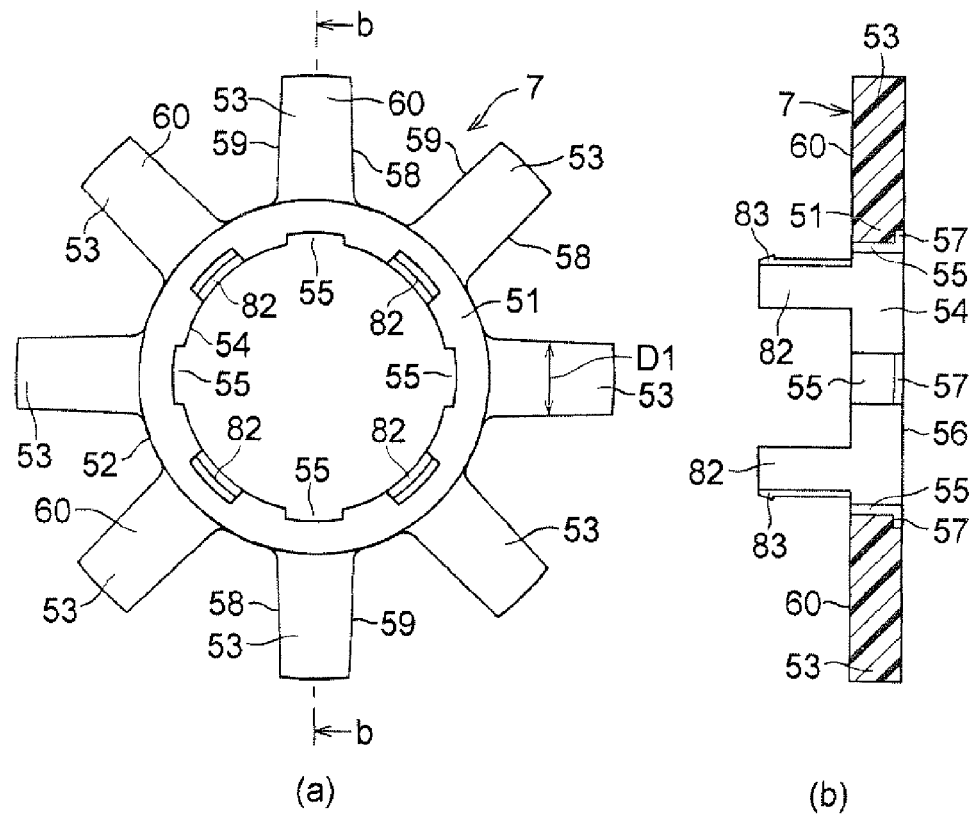
(a) (b)
[Fig.10]
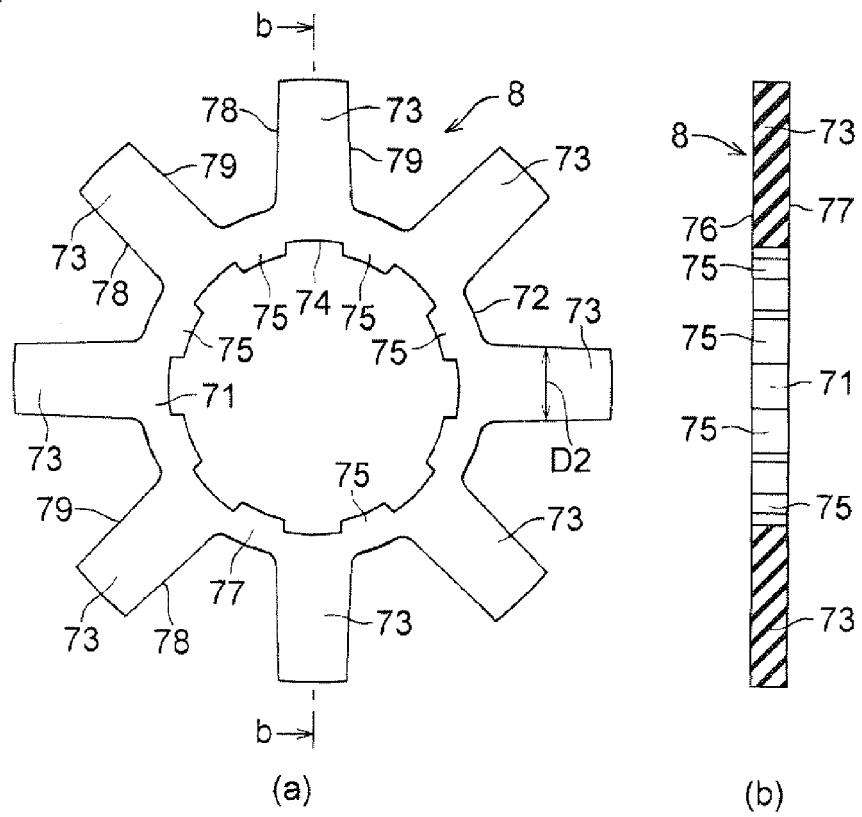
(a) (b)

SHAFT COUPLING MECHANISM FOR ELECTRIC POWER STEERING APPARATUS

This application is the U.S. national phase of International Application No. PCT/JP2005/023083 filed 15 Dec. 2005 which designated the U.S. and claims priority to JP 2004-374410 filed 24 Dec. 2004, the entire contents of each of which are hereby incorporated by reference.

TECHNICAL FIELD

The present invention relates to a shaft coupling mechanism suitable for coupling a rotating shaft on a rotating source side such as an electric motor in an electric power steering apparatus and a rotating shaft on an operating side such as a steering shaft of an automobile.

BACKGROUND ART

Patent document 1: JP-A-2002-518242
Patent document 2: JP-A-2004-148990
Patent document 3: JP-A-2004-149070

An electric power steering apparatus is for facilitating the manual steering of a steering wheel by adding a torque based on the rotation of an output rotating shaft of an electric motor to a torque based on the rotation of the steering wheel which is manually operated. In such an electric power steering apparatus, the steering shaft on the steering wheel side and the rotating shaft on the output rotating shaft side of the electric motor are coupled by means of a shaft coupling mechanism (a coupling).

In the case where the steering shaft and the rotating shaft are coupled by means of the shaft coupling mechanism, there is a possibility that an impact at the time of the reversing of the output rotating shaft of the electric motor and the vibration of the brushes of the electric motor are transmitted to the steering wheel through the shaft coupling mechanism and the steering shaft, thereby causing an unpleasant steering feel to the driver. To avoid this, it has been proposed to provide a spacer made of such as rubber or soft resin for the shaft coupling mechanism.

DISCLOSURE OF THE INVENTION

Problems to be Solved by the Invention

If the spacer is made softer by placing emphasis on the reduction of the impact and vibration, since the soft spacer is likely to undergo creep deformation, backlash can occur in the shaft coupling mechanism owing to the permanent deformation of the spacer due to the repeated load on the spacer. There is a possibility that this can also make the driver's steering feel unpleasant.

On the other hand, if the spacer is made hard by placing emphasis on the durability, the steering feel improves contrary to the above since there is no backlash. However, the steering feel becomes uncomfortable due to the impact and vibration transmitted to the steering wheel, as described above.

The present invention has been devised in view of the above-described circumstances, and its object is to provide a shaft coupling mechanism for an electric power steering apparatus in which backlash in the rotating direction is difficult to occur between one rotating shaft, e.g., a rotating shaft coupled to the output rotating shaft of the electric motor, and another rotating shaft, e.g., the steering shaft coupled to the steering wheel, which makes it possible to reduce the transmission to the steering wheel of the impact at the time of the reversing of the electric motor and the brush vibration, and which hence excels in durability and prevents the steering feel from becoming uncomfortable.

Means for Solving the Problems

A shaft coupling mechanism in accordance with the invention for coupling two rotating shafts by being disposed between the two rotating shafts so as to transmit the rotation of one rotating shaft to the other rotating shaft, comprises: a pair of rotation transmitting members; an intermediate interposed member disposed between the pair of rotation transmitting members; and coupling means for coupling the pair of rotation transmitting members to each other, wherein each of the pair of rotation transmitting members has at least one pair of projecting portions spaced apart from each other in a direction about an axis and extending in a radial direction, the intermediate interposed member has a pair of projecting portions each disposed between the pair of projecting portions of each of the pair of rotation transmitting members in an axial direction and having a larger width in the direction about the axis than a width of each of the pair of projecting portions, and the pair of projecting portions of the intermediate interposed member has a smaller rigidity than the rigidity of the pair of projecting portions of each of the pair of rotation transmitting members and is elastically deformable.

According to the shaft coupling mechanism in accordance with the invention, the intermediate interposed member disposed between the pair of rotation transmitting members in the axial direction has a pair of projecting portions disposed between the pairs of projecting portions of the pair of rotation transmitting members in the axial direction, and having a larger width in the direction about the axis than the width of each of the pair of projecting portions. The pair of projecting portions of the intermediate interposed member has a smaller rigidity than the rigidity of the pair of projecting portions of each of the pair of rotation transmitting members and is elastically deformable. As a result, since the transmission of the one rotating shaft to the other rotating shaft is effected through the elastic deformation of the pair of projecting portions of the intermediate interposed member, the transmission of very small rotation of the one rotating shaft to the other rotating shaft can be reduced or prevented by the elastic deformation of the pair of projecting portions of the intermediate interposed member. Further, the transmission to the other rotating shaft of large relative rotation of the one rotating shaft with respect to the other rotating shaft can be effected as it is through the pair of rotation transmitting members having a greater rigidity than the pair of projecting portions of the intermediate interposed member. Moreover, in the elastic deformation of the pair of projecting portions of the intermediate interposed member in the direction about the axis by more than a fixed degree, the large deformation of the pair of projecting portions of the intermediate interposed member can be prevented by the pair of rotation transmitting members having a greater rigidity, so that even if a flexible resin material having a small rigidity is used for the intermediate interposed member, the permanent deformation of the intermediate interposed member due to creep can be reduced. Moreover, since the pair of rotation transmitting members are coupled to each other through the coupling means, the assembling efficiency can be improved, and the mutual separation in the axial direction between the pair of rotation transmitting members due to the elastic deformation of the intermediate interposed member can be eliminated, thereby making it possible to suppress the enlargement in distance between the pair of rotation transmitting members in the axial direction to a fixed degree. Thus, it is possible to reduce the transmission to the steering wheel of the impact at the time of the reversing of the electric motor and the brush vibration. Furthermore, it is possible to eliminate backlash in the direction about the axis between the both rotating shafts. Hence, the steering feel can be prevented from becoming uncomfortable, and the shaft coupling mechanism can be made to excel in durability and can be provided with stable characteristics.

In the present invention, the pair of rotation transmitting members are preferably formed of a hard resin such as a polyacetal resin, a polyamide resin, or the like, but may be formed of another hard resin exhibiting rigidity. The intermediate interposed member may be formed of a rubber elastic body such as urethane rubber, polyester elastomer, or the like.

In a preferred example of the invention, each of the pair of rotation transmitting members has an annular base portion, the pair of projecting portions of each of the pair of rotation transmitting members are provided integrally on the base portion in such a manner as to extend in the radial direction from an outer peripheral edge of the base portion of a relevant one of the rotation transmitting members, and the coupling means includes a claw portion which is provided integrally on the base portion of one of the rotation transmitting members in such a manner as to extend from an inner peripheral edge of the one rotation transmitting member toward the base portion of another one of the rotation transmitting members, and which at its distal end is caught by an inner peripheral edge of the base portion of the other rotation transmitting member, as well as a claw portion which is provided integrally on the base portion of the other rotation transmitting member in such a manner as to extend from the inner peripheral edge of the other rotation transmitting member toward the base portion of the one rotation transmitting member, and which at its distal end is caught by the inner peripheral edge of the base portion of the one rotation transmitting member.

Preferably, the intermediate interposed member may include an annular base portion and a retaining projection which is provided integrally with the base portion in such a manner as to extend radially from an inner peripheral edge of the base portion, the pair of projecting portions of the intermediate interposed member may be provided integrally with the base portion of the intermediate interposed member in such a manner as to extend radially from an outer peripheral edge of the base portion of the intermediate interposed member, and the retaining projection may be fitted in a cavity defined by the both claw portions of the coupling means. If the intermediate interposed member is positioned with respect to the pair of rotation transmitting members by such a retaining projection through the cavity defined by the both claw portions of the coupling means, the effect derived from the intermediate interposed member can be obtained uniformly with respect to the relative rotation in both directions between the two rotating shafts.

In a preferred example, each of the projecting portions of the rotation transmitting member opposing the projecting portions of the intermediate interposed member in the axial direction is intermediately elevated in the direction about the axis, such that its central portion in the direction about the axis comes into contact with the opposing projecting portion of the intermediate interposed member, while its edge portion in the direction about the axis forms a cavity together with the opposing projecting portion of the intermediate interposed member. If such a cavity is formed, the swelling of an edge portion in the direction about the axis in each of the pair of projecting portions of the intermediate interposed member in the elastic deformation can be absorbed by the cavity. As a result, it is possible to avoid the mutual separation of the projecting portions opposing each other in the axial direction in the pair of rotation transmitting members. Hence, it is possible to effect the stable transmission of the torque.

The shaft coupling mechanism in accordance with the invention is sufficient if it is comprised of a pair of rotation transmitting members and an intermediate interposed member which are disposed between the two rotating shafts as spacers in the direction about the axis. In a preferred example, however, the shaft coupling mechanism further comprises: one coupling base body coupled to the one rotating shaft; and another coupling base body coupled to the other rotating shaft, wherein the one coupling base body has a base portion and a projecting portion projecting integrally from the base portion in the axial direction, and the other coupling base body has a base portion and a projecting portion projecting integrally from the base portion in the axial direction, and wherein the projecting portion of the one coupling base body is disposed in one projecting portion gap between the pair of projecting portions of each of the pair of rotation transmitting members in the direction about the axis and in one projecting portion gap between the pair of projecting portions of the intermediate interposed member in the direction about the axis, and the projecting portion of the other coupling base body is disposed in another projecting portion gap between the pair of projecting portions of each of the pair of rotation transmitting members in the direction about the axis and in another projecting portion gap between the pair of projecting portions of the intermediate interposed member in the direction about the axis. In this case, to ensure that backlash does not occur in the relative initial rotation of the one rotating shaft with respect to the other rotating shaft, each of the projecting portions of the one and the other coupling base bodies at each of its side surfaces in the direction about the axis may be adapted to be in contact with a side surface in the direction about the axis of each of the projecting portions of the intermediate interposed member opposing the same in the direction about the axis in the relative rotation of the both rotating shafts by a fixed degree or less, while each of the projecting portions of the one and the other coupling base bodies at each of its side surfaces in the direction about the axis may be adapted to be in non-contact with a side surface in the direction about the axis of each of the projecting portions of the pair of rotation transmitting members opposing the same in the direction about the axis in the relative rotation of the both rotating shafts by the fixed degree or less, and may be adapted to be in contact therewith in the relative rotation of the both rotating shafts by more than the fixed degree. The one base portion may be secured by being directly coupled to the one rotating shaft, but may be indirectly coupled to the one rotating shaft through another rotation transmitting mechanism such as a gear mechanism. The same applies to the other coupling base body.

The shaft coupling mechanism of the present invention may be a shaft coupling mechanism for an electric power steering apparatus. In this case, the one rotating shaft may be adapted to be coupled to an output rotating shaft of an electric motor, while the other rotating shaft may be adapted to be coupled to a steering shaft of an automobile.

ADVANTAGEOUS EFFECT OF THE INVENTION

According to the present invention, it is possible to provide a shaft coupling mechanism for an electric power steering apparatus in which backlash in the rotating direction is difficult to occur between one rotating shaft, e.g., a rotating shaft coupled to the output rotating shaft of the electric motor, and another rotating shaft, e.g., the steering shaft coupled to the steering wheel, which makes it possible to reduce the transmission to the steering wheel of the impact at the time of the reversing of the electric motor and the brush vibration, and which hence excels in durability and prevents the steering feel from becoming uncomfortable.

Next, a more detailed description will be given of the mode of carrying out the invention on the basis of a preferred embodiment illustrated in the drawings. It should be noted that the present invention is not limited to this embodiment.

BRIEF DESCRIPTION OF THE DRAWINGS

FIG. 1 is a front elevational view of a preferred embodiment of the invention;

FIG. 2 is a partially fragmentary front elevational view of the embodiment shown in FIG. 1;

FIG. 3 is a cross-sectional view, taken in the direction of arrows along line III-III, of the embodiment shown in FIG. 1;

FIG. 4 is a cross-sectional view, taken in the direction of arrows along line IV-IV, of the embodiment shown in FIG. 1;

FIG. 5 is a cross-sectional view, taken in the direction of arrows along line V-V, of the embodiment shown in FIG. 1;

FIG. 6 is a right side elevational view of a coupling base body on the rotating shaft side of the embodiment shown in FIG. 1;

FIG. 7 is a right side elevational view of a coupling base body on the steering shaft side of the embodiment shown in FIG. 1;

FIG. 8 is an explanatory diagram of a rotation transmitting member on the rotating shaft side of the embodiment shown in FIG. 1, in which the part (a) is a right side elevational view, and the part (b) is a cross-sectional view, taken in the direction of arrows along line b-b, of the part (a);

FIG. 9 is an explanatory diagram of a rotation transmitting member on the steering shaft side of the embodiment shown in FIG. 1, in which the part (a) is a left side elevational view, and the part (b) is a cross-sectional view, taken in the direction of arrows along line b-b, of the part (a); and FIG. 10 is an explanatory diagram of an intermediate interposed member of the embodiment shown in FIG. 1, in which the part (a) is a left side elevational view, and the part (b) is a cross-sectional view, taken in the direction of arrows along line b-b, of the part (a).

BEST MODE FOR CARRYING OUT THE INVENTION

In FIGS. 1 to 5, a shaft coupling mechanism 1 for an electric power steering apparatus in accordance with this embodiment is comprised of a coupling base body 3 coupled to a rotating shaft 2; a coupling base body 5 coupled to a steering shaft 4 serving as a rotating shaft; a pair of rotation transmitting members 6 and 7 which are disposed between the rotating shaft 2 and the steering shaft 4 through the both coupling base bodies 3 and 5 and transmit the rotation of the rotating shaft 2 in an R direction to the steering shaft 4; an intermediate interposed member 8 disposed between the pair of rotation transmitting members 6 and 7; and a coupling means 9 for coupling the pair of rotation transmitting members 6 and 7 to each other.

The rotating shaft 2 is a rotating shaft on an electric motor side of the electric power steering apparatus. As particularly shown in FIG. 6, the coupling base body 3 which is rigid includes an annular base portion 11; two pairs of projecting portions 13 projecting integrally from one annular surface 12 of the base portion 11 in an axial direction, i.e., in an A direction, and arranged at equiangular intervals of 90° in the direction about the axis, i.e., in the R direction; and a through hole 14 in which the rotating shaft 2 is fitted and secured therein. As particularly shown in FIG. 7, the coupling base body 5 which is rigid includes an annular base portion 16; two pairs of projecting portions 18 projecting integrally from one annular surface 17 of the base portion 16 in the A direction and arranged at equiangular intervals of 90° in the R direction; and a through hole 19 in which the steering shaft 4 is fitted and secured therein.

Each of the projecting portions 13 has in the R direction a pair of side surfaces 21 and 22 serving as rotation transmitting rigid surfaces, and each of the projecting portions 18 also has in the R direction a pair of side surfaces 23 and 24 serving as rotation transmitting rigid surfaces.

As particularly shown in FIG. 8, the rotation transmitting member 6, which is formed integrally from a polyacetal resin, a polyamide resin, or the like and is rigid, includes an annular base portion 31 disposed concentrically with the base portion 11; four pairs of projecting portions 33 which are provided integrally with the base portion 31 in such a manner as to extend radially from a cylindrical outer peripheral edge 32 of the base portion 31 and are disposed in such a manner as to be spaced apart from each other at equiangular intervals of 45° in the R direction; four grooves 35 provided in a cylindrical inner peripheral edge 34 of the base portion 31 in such a manner as to extend in the A direction and to be spaced apart from each other at equiangular intervals of 90° in the R direction; and four retaining grooves 37 which are each connected to one end of each groove 35 and are provided at the inner peripheral edge 34 of the base portion 31 and in a surface 36 of the base portion 31 opposing the annular surface 12.

Each of the projecting portions 33 has in the R direction a pair of side surfaces 38 and 39 serving as rotation transmitting rigid surfaces, and a surface 40 of each projecting portion 33 opposing the intermediate interposed member 8 is intermediately elevated in the R direction.

As particularly shown in FIG. 9, in the same way as the rotation transmitting member 6, the rotation transmitting member 7, which is formed integrally from a polyacetal resin, a polyamide resin, or the like and is rigid, includes an annular base portion 51 disposed concentrically with the base portion 16; four pairs of projecting portions 53 which are provided integrally with the base portion 51 in such a manner as to extend radially from a cylindrical outer peripheral edge 52 of the base portion 51 and are disposed in such a manner as to be spaced apart from each other at equiangular intervals of 45° in the R direction; four grooves 55 provided in a cylindrical inner peripheral edge 54 of the base portion 51 in such a manner as to extend in the A direction and to be spaced apart from each other at equiangular intervals of 90° in the R direction; and four retaining grooves 57 which are each connected to one end of each groove 55 and are provided at the inner peripheral edge 54 of the base portion 51 and in a surface 56 of the base portion 51 opposing the annular surface 17. The rotation transmitting member 7 is thus constructed identically to the rotation transmitting member 6.

Each of the projecting portions 53 has in the R direction a pair of side surfaces 58 and 59 serving as rotation transmitting rigid surfaces, and a surface 60 of each projecting portion 53 opposing the intermediate interposed member 8 is intermediately elevated in the R direction.

The rotation transmitting member 6 and the rotation transmitting member 7 are disposed concentrically with the intermediate interposed member 8 interposed therebetween, such that the base portion 31 and the base portion 51, as well as each of the projecting portions 33 and each of the projecting portions 53, respectively oppose each other in the R direction.

The intermediate interposed member 8 has a smaller rigidity than the rotation transmitting members 6 and 7, is elastically deformable, and is formed integrally of a rubber elastic body such as urethane rubber, polyester elastomer, or the like. As particularly shown in FIG. 10, the intermediate interposed member 8 includes an annular base portion 71 disposed concentrically with the base portions 31 and 51; four pairs of projecting portions 73 which are provided integrally with the base portion 71 in such a manner as to extend radially from a cylindrical outer peripheral edge 72 of the base portion 71 and are disposed in such a manner as to be spaced apart from each other at equiangular intervals of 45° in the R direction; and eight retaining projections 75 which are provided integrally with the base portion 71 in such a manner as to extend radially from a cylindrical inner peripheral edge 74 of the base portion 71 and are provided in such a manner as to be spaced apart from each other at equiangular intervals of 45° in the R direction. The intermediate interposed member 8 is disposed in such a manner as to be sandwiched between the pair of rotation transmitting members 6 and 7 and in contact therewith.

Each of the projecting portions 73 of the intermediate interposed member 8 has a smaller rigidity than the rigidity of each of the projecting portions 33 and 53 of the rotation transmitting members 6 and 7, and is elastically deformable. Each of the projecting portions 73 is disposed between corresponding ones of the projecting portions 33 and 53 of the rotation transmitting members 3 and 4 in the A direction, and has a larger width D2 in the R direction than the width D1 of each of the projecting portions 33 and 53.

The intermediate interposed member 8 is flat at its surface 76 facing the rotation transmitting member 6 and at its surface 77 facing the rotation transmitting member 7, and each of the projecting portions 73 has side surfaces 78 and 79 in the R direction.

The rotation transmitting members 6 and 7 and the intermediate interposed member 8 sandwiched between the rotation transmitting members 6 and 7 are disposed concentrically such that the base portions 31 and 51 and the base portion 71, as well as each of the projecting portions 33 and 53 and each of the projecting portions 73, respectively oppose each other in the A direction.

The coupling means 9 includes four claw portions 81 which are provided integrally on the base portion 31 in such a manner as to extend from the inner peripheral edge 34 of the rotation transmitting member 6 toward the base portion 51 of the rotation transmitting member 7 through the grooves 55, and which at their distal ends are caught by the inner peripheral edge 54 of the base portion 51 of the rotation transmitting member 7 at the retaining grooves 57; and claw portions 82 which are provided integrally on the base portion 51 in such a manner as to extend from the inner peripheral edge 54 of the rotation transmitting member 7 toward the annular base portion 31 of the rotation transmitting member 6 through the grooves 35, and which at their distal ends are caught by the inner peripheral edge 34 of the base portion 31 of the rotation transmitting member 6 at the retaining grooves 37. Each of the claw portions 81 and 82 has at its distal end a clasp portion 83, and is caught at each clasp portion 83 by the inner peripheral edge 54 in the retaining groove 57 and by the inner peripheral edge 34 in the retaining groove 37. The rotation transmitting members 6 and 7 are coupled to each other by such a coupling means 9. The retaining projections 75 of the intermediate interposed member 8 are respectively fitted in cavities 84 which are defined by the both claw portions 81 and 82 of the coupling means 9 and the base portions 31 and 51.

With respect to the intermediate interposed member 8 and the rotation transmitting members 6 and 7 coupled to each other by the coupling means 9 with the intermediate interposed member 8 interposed therebetween, each of the projecting portions 13 of the coupling base body 3 is disposed between one projecting portions 33 and 53 of the respective pairs of projecting portions 33 and 53 of the rotation transmitting members 6 and 7, i.e., between alternate ones of the projecting portions 33 and 53, as well as between one projecting portions 73 of the respective pairs of projecting portions 73 of the intermediate interposed member 8, i.e., between alternate ones of the projecting portions 73, in the R direction. Meanwhile, each of the projecting portions 18 of the coupling base body 5 is disposed between the other projecting portions 33 and 53 of the respective pairs of projecting portions 33 and 53 of the rotation transmitting members 6 and 7, i.e., between the remaining alternate ones of the projecting portions 33 and 53, as well as between the other projecting portions 73 of the respective pairs of projecting portions 73 of the intermediate interposed member 8, i.e., between the remaining alternate ones of the projecting portions 73, in the R direction. In the relative rotation by a fixed degree or less in the R direction between the rotating shaft 2 and the steering shaft 4, each of the projecting portions 13 of the coupling base body 3 at its side surfaces 21 and 22 in the R direction is in contact with the side surfaces 78 and 79 in the R direction of each projecting portion 73 of the intermediate interposed member 8, but is in non-contact with the side surfaces 38 and 39 as well as 58 and 59 of the projecting portions 33 and 53 of the rotation transmitting members 6 and 7 opposing them in the R direction. Meanwhile, each of the projecting portions 18 of the coupling base body 5 at its side surfaces 23 and 24 in the R direction is in contact with the side surfaces 78 and 79 in the R direction of each projecting portion 73 of the intermediate interposed member 8, but is in non-contact with the side surfaces 38 and 39 as well as 58 and 59 of the projecting portions 33 and 53 of the rotation transmitting members 6 and 7 opposing them in the R direction.

Each of the projecting portions 33 and 53 of the rotation transmitting members 6 and 7, which opposes the projecting portion 73 of the intermediate interposed member 8 in the A direction and is intermediately elevated in the R direction is, at its central portion in the R direction, in contact with each of the surfaces 76 and 77 of the corresponding projecting portion 73 in the opposing intermediate interposed member 8, but forms, at its edge portion in the R direction, a cavity 91 with respect to each of the surfaces 76 and 77 of the corresponding projecting portion 73 in the opposing intermediate interposed member 8.

With the electric power steering apparatus equipped with the above-described shaft coupling mechanism 1 for mutually coupling the rotating shaft 2 and the steering shaft 4, which are two rotating shafts, when the steering wheel is manually operated by the driver, the steering shaft 4 is rotated in the R direction, and the rotation of the steering shaft 4 in the R direction is transmitted to a drag link and the like as reciprocating motion through an unillustrated transmission mechanism such as gears, thereby imparting a steering force for steering wheels (wheels). In the manual operation of the steering wheel by the driver, when the electric motor which is controlled by a detection signal from a torque detector for detecting the torque applied to the steering wheel is operated, the rotating shaft 2 is rotated in the R direction. The rotation of the coupling base body 3 in the R direction is then transmitted to the projecting portions 18 of the coupling base body 5 through the pressing against the projecting portions 33 and 53 by the projecting portions 13 in the R direction on the basis of contact of the side surfaces 21 with the side surfaces 38 and 58 or contact of the side surfaces 22 with the side surfaces 39 and 59 after the deformation of the projecting portions 73 by the projecting portions 13 in the R direction. As a result, the torque of the rotating shaft 2 in the R direction is added to the torque of the steering shaft 4 in the R direction, thereby assisting the manual operation of the steering wheel by the driver.

With the shaft coupling mechanism 1, in both the state in which the steering wheel is not manually operated by the driver and the steering shaft 4 is not rotated in the R direction and the state in which the steering wheel is manually operated by the driver and the steering shaft 4 is rotated in the R direction, in a case where the relative rotation of the rotating shaft 2 in the R direction with respect to the steering shaft 4 is very small within about half of a difference between the width D2 and the width D1, the projecting portions 73 easily undergo compressive deformation. As a result, such a very small relative rotation of the rotating shaft 2 in the R direction is almost not transmitted to the steering shaft 4. Thus, it is possible to reduce the transmission to the steering wheel of the impact at the time of the reversing of the electric motor and the brush vibration through the shaft coupling mechanism 1 and the steering shaft 4, thereby making it possible to prevent the steering feel from becoming uncomfortable. Moreover, after the compressive deformation of the projecting portions 73 by more than a fixed degree, there occur the contact of the side surfaces 21 with the side surfaces 38 and 58 or the contact of the side surfaces 22 with the side surfaces 39 and 59, making it possible to suppress any further compressive deformation of the projecting portions 73. As a result, the permanent set of each projecting portion 73 due to creep can be prevented, and the mutual contact of each of the side surfaces 21 and 22 as well as 23 and 24 and the side surfaces 78 and 79 in the projecting portions 13 and 18 and the projecting portions 73 in the R direction can be maintained over long periods of time, with the result that backlash is made difficult to occur between the steering shaft 4 and the rotating shaft 2 in the R direction. In addition, when the steering wheel 4 is rotated in the R direction by the manual operation by the driver, and the rotating shaft 2 is rotated in the R direction by the operation of the electric motor such that the rotating shaft 2 tends to be relatively rotated in the R direction by more than a fixed degree, i.e., by more than about half of the difference between the width D2 and the width D1, with respect to the steering shaft 4, the rotation transmitting members 6 and 7 transmit the rotation of the rotating shaft 2 in the R direction to the steering shaft 4 by responding to such relative rotation in the R direction by more than the fixed degree by means of the pressing of the projecting portions 33 and 53 by the projecting portions 13 in the R direction on the basis of the contact of the side surfaces 21 with the side surfaces 38 and 58 or the contact of the side surfaces 22 with the side surfaces 39 and 59, thereby assisting the rotation of the steering shaft 4.

As described above, according to the shaft coupling mechanism 1, the intermediate interposed member 8 disposed between the rotation transmitting members 6 and 7 has the projecting portions 73 each of which is disposed between the respective ones of the projecting portions 33 and 53 of the rotation transmitting members 6 and 7 in the A direction and has the larger width D2 in the R direction than the width D1 of each of the projecting portions 33 and 53. Each projecting portion 73 of the intermediate interposed member 8 has a smaller rigidity than the rigidity of each of the projecting portions 33 and 53 of the rotation transmitting members 6 and 7. As a result, the transmission of the rotation of the rotating shaft 2 in the R direction to the steering shaft 4 is effected through the elastic deformation of the projecting portions 73 of the intermediate interposed member 8. Therefore, the transmission of very small rotation of the rotating shaft 2 in the R direction to the steering shaft 4 can be reduced or prevented by the elastic deformation of the projecting portions 73 of the intermediate interposed member 8, while the transmission to the steering shaft 4 of large relative rotation of the rotating shaft 2 in the R direction with respect to the steering shaft 4 can be effected as it is through the rotation transmitting members 6 and 7 having a greater rigidity than the projecting portions 73 of the intermediate interposed member 8. Moreover, in the relative rotation of the rotating shaft 2 in the R direction by more than a fixed degree with respect to the steering shaft 4, the large elastic deformation of the projecting portions 73 of the intermediate interposed member 8 can be prevented by the rotation transmitting members 6 and 7 having a greater rigidity, so that even if a flexible resin material having a small rigidity is used for the intermediate interposed member 8, the permanent deformation of the intermediate interposed member 8 due to creep can be reduced. Moreover, since the pair of rotation transmitting members 6 and 7 are coupled to each other through the coupling means 9, the assembling efficiency can be improved, and the mutual separation in the A direction between the pair of rotation transmitting members 6 and 7 due to the elastic deformation of the intermediate interposed member 8 can be eliminated, thereby making it possible to suppress the expansion of the pair of rotation transmitting members 6 and 7 in the A direction to a fixed degree. Thus, it is possible to reduce the transmission to the steering wheel of the impact at the time of the reversing of the electric motor and the brush vibration. Furthermore, it is possible to eliminate backlash in the R direction between the rotating shaft 2 and the steering shaft 4. Hence, the steering feel can be prevented from becoming uncomfortable, and the shaft coupling mechanism can be made to excel in durability and can be provided with stable characteristics.

In addition, according to the shaft coupling mechanism 1, since the intermediate interposed member 8 is positioned concerning the R direction with respect to the pair of rotation transmitting members 6 and 7 by the retaining projections 75 through the cavities 84 defined by the both claw portions 81 and 82 of the coupling means 9, the effect derived from the intermediate interposed member 8 can be obtained uniformly with respect to both relative rotations in the R direction between the rotating shaft 2 and the steering shaft 4.

In addition, according to the shaft coupling mechanism 1, since the cavities 91 are formed, the compressively deformed and collapsed swelling of edge portions in the R direction in the respective projecting portions 73 of the intermediate interposed member 8 can be absorbed by the cavities 91. As a result, it is possible to avoid the mutual separation of the projecting portions 33 and 53 opposing each other in the A direction in the pair of rotation transmitting members 6 and 7. Moreover, portions of the compressively deformed and collapsed projecting portions 73 of the intermediate interposed member 8 are prevented from covering the side surfaces 38 and 39 as well as 58 and 59 of the projecting portions 33 and 53 by spreading to the side surfaces 38 and 39 as well as 58 and 59 of the projecting portions 33 and 53. In consequence, it is possible to more effectively prevent the permanent set of the projecting portions 73 of the intermediate interposed member 8 due to creep. Thus, it is possible to maintain the rigidity of the pair of rotation transmitting members 6 and 7 in the R direction, and effect the stable transmission of the torque.

Although the shaft coupling mechanism 1 in the above-described embodiment is comprised of a single intermediate interposed member 8, the shaft coupling mechanism 1 may alternatively be comprised of two or more intermediate interposed members 8, and the number of each of the rotation transmitting members 6 and 7 may be two or more. In addition, the numbers of the projecting portions 13 and 18 of the coupling base bodies 3 and 5, the projecting portions 33 and 53 of the rotation transmitting members 6 and 7, the projecting portions 73 of the intermediate interposed member 8, the claw portions 81 of the coupling means 9, and the retaining projections 75 of the intermediate interposed member 8 are not limited to the aforementioned numbers.

The invention claimed is:

1. A shaft coupling mechanism for coupling two rotating shafts by being disposed between the two rotating shafts so as to transmit the rotation of one rotating shaft to the other rotating shaft, comprising:
   a pair of rotation transmitting members;
   an intermediate interposed member disposed between said pair of rotation transmitting members; and
   a coupling device adapted to couple said pair of rotation transmitting members to each other, wherein each of said pair of rotation transmitting members has at least one pair of projecting portions spaced apart from each other in a direction about an axis and extending in a radial direction, said intermediate interposed member has a pair of projecting portions each disposed between the pair of projecting portions of each of said pair of rotation transmitting members in an axial direction and having a larger width in the direction about the axis than a width of each of the pair of projecting portions, and the pair of projecting portions of said intermediate interposed member has a smaller rigidity than the rigidity of the pair of projecting portions of each of said pair of rotation transmitting members and is elastically deformable, each of said pair of rotation transmitting members having an annular base portion, the pair of projecting portions of each of said pair of rotation transmitting members being provided integrally on the base portion in such a manner as to extend in the radial direction from an outer peripheral edge of the base portion of a relevant one of said rotation transmitting members, and said coupling device including a claw portion which is provided integrally on the base portion of one of said rotation transmitting members in such a manner as to extend from an inner peripheral edge of the base portion of said one rotation transmitting member toward the base portion of another one of said rotation transmitting members, and which at its distal end is caught by an inner peripheral edge of the base portion of said other rotation transmitting member.

2. The shaft coupling mechanism according to claim 1, wherein said intermediate interposed member includes an annular base portion and a retaining projection which is provided integrally with the base portion in such a manner as to extend radially from an inner peripheral edge of the base portion, the pair of projecting portions of said intermediate interposed member are provided integrally with the base portion of said intermediate interposed member in such a manner as to extend radially from an outer peripheral edge of the base portion of said intermediate interposed member.

3. The shaft coupling mechanism according to claim 1, wherein each of the projecting portions of said pair of rotation transmitting members opposing the projecting portions of said intermediate interposed member in the axial direction is intermediately elevated in the direction about the axis, such that its central portion in the direction about the axis comes into contact with the opposing projecting portion of the intermediate interposed member, while its edge portion in the direction about the axis forms a cavity together with the opposing projecting portion of the intermediate interposed member.

4. The shaft coupling mechanism according to claim 1, further comprising:
   one coupling base body coupled to the one rotating shaft; and
   another coupling base body coupled to the other rotating shaft, wherein said one coupling base body has a base portion and a projecting portion projecting integrally from the base portion in the axial direction, and said other coupling base body has a base portion and a projecting portion projecting integrally from the base portion in the axial direction, and wherein the projecting portion of said one coupling base body is disposed in one projecting portion gap between the pair of projecting portions of each of said pair of rotation transmitting members in the direction about the axis and in one projecting portion gap between the pair of projecting portions of said intermediate interposed member in the direction about the axis, and the projecting portion of said other coupling base body is disposed in another projecting portion gap between the pair of projecting portions of each of said pair of rotation transmitting members in the direction about the axis and in another projecting portion gap between the pair of projecting portions of said intermediate interposed member in the direction about the axis.

5. The shaft coupling mechanism according to claim 4, wherein each of the projecting portions of said one and said other coupling base bodies at each of its side surfaces in the direction about the axis is adapted to be in contact with a side surface in the direction about the axis of each of the projecting portions of said intermediate interposed member opposing the same in the direction about the axis in the relative rotation of the both rotating shafts by a fixed degree or less, while each of the projecting portions of said one and said other coupling base bodies at each of its side surfaces in the direction about the axis is adapted to be in non-contact with a side surface in the direction about the axis of each of the projecting portions of said pair of rotation transmitting members opposing the same in the direction about the axis in the relative rotation of the both rotating shafts by the fixed degree or less, and is adapted to be in contact therewith in the relative rotation of the both rotating shafts by more than the fixed degree.

6. The shaft coupling mechanism according to claim 1, wherein said shaft coupling mechanism is a shaft coupling mechanism for an electric power steering apparatus, and the one rotating shaft is adapted to be coupled to an output rotating shaft of an electric motor, while the other rotating shaft is adapted to be coupled to a steering shaft of an automobile.

7. The shaft coupling mechanism according to claim 1, wherein said coupling device further includes a claw portion which is provided integrally on the base portion of said other rotation transmitting member in such a manner as to extend from the inner peripheral edge of the base portion of said other rotation transmitting member toward the base portion of said one rotation transmitting member, and which at its distal end is caught by the inner peripheral edge of the base portion of said one rotation transmitting member.

8. The shaft coupling mechanism according to claim 7, wherein the retaining projection is fitted in a cavity defined by the both claw portions of said coupling device.

9. A shaft coupling mechanism for coupling two rotating shafts by being disposed between the two rotating shafts so as to transmit the rotation of one rotating shaft to the other rotating shaft, comprising: a pair of rotation transmitting members; an intermediate interposed member disposed between said pair of rotation transmitting members; and coupling device adapted to couple said pair of rotation transmitting members to each other, wherein each of said pair of rotation transmitting members has at least one pair of projecting portions spaced apart from each other in a direction about an axis and extending in a radial direction, said intermediate interposed member has a pair of projecting portions each disposed between the pair of projecting portions of each of said pair of rotation transmitting members in an axial direction and having a larger width in the direction about the axis than a width of each of the pair of projecting portions, the pair of projecting portions of said intermediate interposed member has a smaller rigidity than the rigidity of the pair of projecting portions of each of said pair of rotation transmitting members and is elastically deformable, and each of the projecting portions of said pair of rotation transmitting members opposing the projecting portions of said intermediate interposed member in the axial direction is intermediately elevated in the direction about the axis, such that its central portion in the direction about the axis comes into contact with the opposing projecting portion of the intermediate interposed member, while its edge portion in the direction about the axis forms a cavity together with the opposing projecting portion of the intermediate interposed member.

10. The shaft coupling mechanism according to claim 9, wherein each of said pair of rotation transmitting members has an annular base portion, the pair of projecting portions of each of said pair of rotation transmitting members are provided integrally on the base portion in such a manner as to extend in the radial direction from an outer peripheral edge of the base portion of a relevant one of said rotation transmitting members, and said coupling device includes a claw portion which is provided integrally on the base portion of one of said rotation transmitting members in such a manner as to extend from an inner peripheral edge of the base portion of said one rotation transmitting member toward the base portion of another one of said rotation transmitting members, and which at its distal end is caught by an inner peripheral edge of the base portion of said other rotation transmitting member.

11. The shaft coupling mechanism according to claim 10, wherein said coupling device further includes a claw portion which is provided integrally on the base portion of said other rotation transmitting member in such a manner as to extend from the inner peripheral edge of the base portion of said other rotation transmitting member toward the base portion of said one rotation transmitting member, and which at its distal end is caught by the inner peripheral edge of the base portion of said one rotation transmitting member, said intermediate interposed member including an annular base portion and a retaining projection which is provided integrally with the base portion in such a manner as to extend radially from an inner peripheral edge of the base portion, the pair of projecting portions of said intermediate interposed member being provided integrally with the base portion of said intermediate interposed member in such a manner as to extend radially from an outer peripheral edge of the base portion of said intermediate interposed member.

12. The shaft coupling mechanism according to claim 11, wherein the retaining projection is fitted in a cavity defined by the both claw portions of said coupling device.

13. The shaft coupling mechanism according to claim 9, further comprising: one coupling base body coupled to the one rotating shaft; and another coupling base body coupled to the other rotating shaft, wherein said one coupling base body has a base portion and a projecting portion projecting integrally from the base portion in the axial direction, and said other coupling base body has a base portion and a projecting portion projecting integrally from the base portion in the axial direction, and wherein the projecting portion of said one coupling base body is disposed in one projecting portion gap between the pair of projecting portions of each of said pair of rotation transmitting members in the direction about the axis and in one projecting portion gap between the pair of projecting portions of said intermediate interposed member in the direction about the axis, and the projecting portion of said other coupling base body is disposed in another projecting portion gap between the pair of projecting portions of each of said pair of rotation transmitting members in the direction about the axis and in another projecting portion gap between the pair of projecting portions of said intermediate interposed member in the direction about the axis.

14. The shaft coupling mechanism according to claim 13, wherein each of the projecting portions of said one and said other coupling base bodies at each of its side surfaces in the direction about the axis is adapted to be in contact with a side surface in the direction about the axis of each of the projecting portions of said intermediate interposed member opposing the same in the direction about the axis in the relative rotation of the both rotating shafts by a fixed degree or less, while each of the projecting portions of said one and said other coupling base bodies at each of its side surfaces in the direction about the axis is adapted to be in non-contact with a side surface in the direction about the axis of each of the projecting portions of said pair of rotation transmitting members opposing the same in the direction about the axis in the relative rotation of the both rotating shafts by the fixed degree or less, and is adapted to be in contact therewith in the relative rotation of the both rotating shafts by more than the fixed degree.

15. The shaft coupling mechanism according to claim 9, wherein said shaft coupling mechanism is a shaft coupling mechanism for an electric power steering apparatus, and the one rotating shaft is adapted to be coupled to an output rotating shaft of an electric motor, while the other rotating shaft is adapted to be coupled to a steering shaft of an automobile.

* * * * *